United States Patent
Dussac et al.

(10) Patent No.: US 6,766,985 B2
(45) Date of Patent: Jul. 27, 2004

(54) STRUCTURAL ASSEMBLY OF PART OF AN AIRCRAFT AND AIRCRAFT, PARTICULARLY ROTARY-WING AIRCRAFT, COMPRISING SUCH A STRUCTURAL ASSEMBLY

(75) Inventors: Marc Dussac, Miramas (FR); Henri-Charles Vincent, Marseilles (FR)

(73) Assignee: Eurocopter, Marignane Cedex (FR)

( * ) Notice: Subject to any disclaimer, the term of this patent is extended or adjusted under 35 U.S.C. 154(b) by 0 days.

(21) Appl. No.: 10/212,813

(22) Filed: Aug. 7, 2002

(65) Prior Publication Data

US 2003/0042363 A1 Mar. 6, 2003

(30) Foreign Application Priority Data

Sep. 6, 2001 (FR) .......................................... 01 11531

(51) Int. Cl.[7] ................................................. B64C 1/00
(52) U.S. Cl. ................. 244/119; 244/117 R; 244/129.1
(58) Field of Search ............................ 244/199, 177 R, 244/129.1

(56) References Cited

U.S. PATENT DOCUMENTS

| | | | |
|---|---|---|---|
| 2,095,626 A | | 10/1937 | Bassett et al. |
| 2,925,050 A | | 2/1960 | Candlin, Jr. et al. |
| 4,053,126 A | * | 10/1977 | Duret et al. ................. 244/119 |
| 4,185,799 A | * | 1/1980 | Richards, Jr. ............. 244/118.5 |
| 4,442,647 A | * | 4/1984 | Olsen ........................... 52/393 |
| 4,799,631 A | * | 1/1989 | Humphries et al. ....... 244/118.5 |
| 5,876,024 A | * | 3/1999 | Hain ........................ 267/141.4 |
| 5,984,233 A | * | 11/1999 | Snyder et al. ............... 244/119 |
| 6,158,690 A | | 12/2000 | Wadey et al. |

FOREIGN PATENT DOCUMENTS

| | | |
|---|---|---|
| DE | 4138047 | 6/1992 |
| EP | 0279620 | 8/1988 |
| GB | 1067187 | 5/1967 |

* cited by examiner

Primary Examiner—Michael J. Carone
Assistant Examiner—Rick Palabrica
(74) Attorney, Agent, or Firm—Stevens, Davis, Miller & Mosher, LLP (57) ABSTRACT

Structural assembly of part of an aircraft and aircraft, particularly a rotary-wing aircraft, comprising such a structural assembly.

The structural assembly comprises an outer structure (3) equipped with a floor (4), a cladding assembly (5) comprising cladding panels (6) forming a self-supporting envelope (7) which is arranged inside (9) the outer structure (3) and mounted on the floor (4), and a connecting system (10) for connecting the self-supporting envelope (7) to the outer structure (3). The connecting system (10) comprises a number of connecting means (11) which, by rigid and permanent connections, fix the self-supporting envelope (7) to the outer structure (3) and perform this rigid and permanent fixing only between the floor (4) of the outer structure (3) and ends (12) of cladding panels (6) of the self-supporting envelope (7).

12 Claims, 4 Drawing Sheets

STRUCTURAL ASSEMBLY OF PART OF AN AIRCRAFT AND AIRCRAFT, PARTICULARLY ROTARY-WING AIRCRAFT, COMPRISING SUCH A STRUCTURAL ASSEMBLY

BACKGROUND OF THE INVENTION

The present invention relates to a structural assembly of part of an aircraft, particularly a rotary-wing aircraft and especially a helicopter, and to an aircraft equipped with such a structural assembly.

The part of the aircraft taken into consideration in this invention is preferably a part intended to be occupied by people, such as the cockpit or the passenger cabin for example. It is known that the structural assembly of such a part of an aircraft comprises, in particular, part of the structure of the fuselage of the aircraft, and cladding panels which are fixed to the interior of this part of the fuselage structure.

It is also known that present inside such a structural assembly is a phenomenon which is particularly troublesome to the occupants, particularly in the case of a rotary-wing aircraft, and that is, noise.

More particularly, with a rotary-wing aircraft it is known that the acoustic spectra defined in the domain between 20 Hz and 20 kHz originate from the superposition of noises of differing origins, which can be grouped into two different groups according to their spectral characteristics, namely pure sounds or spectral-line noise and broadband noise.

In the known way, pure sounds or spectral-line noise occur particularly, as appropriate:

at the characteristic frequencies of the aircraft driveline;
at the sweep frequencies of the (main and tail) rotor blades and at the harmonics of these frequencies;
at the sweep frequencies of the blades of the compressors of the turbine engine units; and/or
at the sweep frequencies of the blades of the fans that cool the main transmission gearbox and/or electrical equipment and at the harmonics of these frequencies, whereas broadband noise comprises, in particular, as appropriate:

the noise of the boundary layer which grows along the fuselage;
the noise generated by the rotors;
the air inlet and nozzle flow noise;
the engine noise; and/or
the noise of the cockpit or passenger cabin climate-control or heating circuits.

Although all these noises can pose problems, the acoustic annoyance felt by the passengers and crew is caused essentially by the spectral-line noise originating from the main transmission gearbox [arranged between the engine(s) and the (main and tail) rotors] and/or from the engine(s) situated over the cabin, and from noise of aerodynamic origin coming from the main rotor and the air intakes. As a result, the present invention which intends to limit this acoustic annoyance has the objective mainly of reducing said spectral-line noise.

There are various known solutions for reducing such noise inside a rotary-wing aircraft, particularly a helicopter.

It is known that the technique generally employed for reducing, on an industrial scale, the internal noise of a helicopter consists in reducing the level of vibration or the radiation of sources of noise and/or of the fuselage. The design of the appropriate treatments calls upon the following physical mechanisms:

reducing the vibration response by adding highly damping material to the panels that make up the structure;
reducing the acoustic transmission and/or the acoustic radiation of these same panels by modifying the stiffness (use of localized stiffeners or optimization of the stack of layers in the case of a sandwich structure);
introducing acoustic absorption by bonding sound-deadening foams onto one side of the structural panel or cladding or using sachets of glass wool, rockwool, etc.;
having a double-partition effect between a structural panel and its cladding panel; and
using a Helmholtz resonators effect by adding perforated fabrics to the panels.

The first three solutions do actually make it possible to reduce the overall noise level in a cabin over a large range of frequencies but incur a high penalty in terms of mass. In addition, they entail direct treatment of the structure and have therefore to meet numerous requirements: fire resistance, maintenance, etc. Furthermore, the attenuation of the emergence of the spectral-line noise is not sufficient to cause the acoustic annoyance specific to pure sounds to disappear. As to the fifth solution, it does actually allow noise to be reduced in a narrow frequency band, but only for a frequency chosen at the time of design of the panels. The fourth solution on the other hand is far more attractive because it leads to an increase in the acoustic attenuation by virtue of the double partition effect.

Furthermore, it is known that the cladding panels are generally fixed to the structure of the fuselage of a helicopter using blocks. This solution has the disadvantage of not sufficiently attenuating the noise level, because of the numerous blocks that have to be used for this purpose and because of the proximity of some of the blocks to the main lift and forward travel rotor of the helicopter, which is the main source of noise. Furthermore, such a known solution often leaves gaps and discontinuities between the cladding panels, and this of course leads to reduced acoustic insulation.

DESCRIPTION OF THE PRIOR ART

To at least partially overcome this noise problem, document U.S. Pat. No. 6,158,690, envisages a structural assembly of part of an aircraft, which comprises:

an external structure which corresponds to part of the structure of the fuselage of the aircraft;
a cladding assembly which comprises a rigid framework formed of arcs which are held together by crossmembers, and cladding panels attached to this framework; and
main connecting means, in this instance insulators, for connecting, through an elastic fixing or semi-rigid connection, the framework of said cladding assembly to the side walls of said external structure.

These insulators comprise in particular elements, particularly rings, made of elastomer, that is to say of an elastic material able to reduce vibration, and are arranged toward the bottom of the walls, so as to be distant from the roof where, in the case of the cabin of a rotary-wing aircraft, the lift and forward travel rotor, which is an important noise source, is situated. These various characteristics of the insulators make it possible to reduce the noise inside the cladding assembly.

Furthermore, said cladding assembly is also held by auxiliary means, with respect to the external structure, namely:

at the top of the walls, by elastic buffers which are arranged in such a way as always to be simultaneously in contact with the cladding assembly and with the external structure, but which are fixed only to the external structure and are simply in contact with the cladding assembly; and at the bottom, by elastic attachments (equipped with elastomer insulating elements) connecting the cladding assembly to the floor of the external structure.

However, this known structural assembly, which thus makes it possible to bring about a reduction in noise, does exhibit several disadvantages:

the reduction in noise remains limited, particularly:
because of the elastic buffers which transmit vibration from the external structure to the framework of the cladding assembly because they are always in contact with these two elements, which vibration is great in the upper part where these buffers are located because of the proximity to the main rotor in the case of a rotary-wing aircraft; and because of the insulators which, although distant from the main rotor, are nonetheless situated a certain height off the floor, and which above all act directly on the framework which, as is known, because of its construction (arcs connected together by cross members to form a rigid assembly) encourages the transmission of the various vibrations which are sources of noise;

the various connecting means (insulators) and holding means (buffers and attachments) have a short life, because of the presence of the elastic material (elastomer); and in the event of a crash or violent impact, the retention of the cladding assembly in the upper part is at the very least uncertain because there is no fixing present in the upper part of the cladding assembly, the effectiveness of the buffers (which are fixed only to the external structure) of course being reduced and insufficient in such a situation, and this may lead to very detrimental effects.

SUMMARY OF THE INVENTION

It is an object of the present invention to overcome these disadvantages. The invention relates to a structural assembly of part of an aircraft, particularly of a rotary-wing aircraft and which in particular makes it possible to reduce the noise inside this structural assembly.

To this end, according to the invention, said structural assembly of the type comprising:

an external structure which corresponds to part of the structure of the aircraft and is equipped with a floor;

a cladding assembly comprising a number of cladding panels which are joined together rigidly so as to form a self-supporting envelope which has a shape such that it can be mounted, with an intermediate space, inside said outer structure, said self-supporting envelope being arranged inside said outer structure and mounted on said floor; and a connecting system for connecting said self-supporting envelope to said outer structure, is notable in that said connecting system comprises a number of connecting means which are formed in such a way as to fix said self-supporting envelope to said outer structure by rigid and permanent connections and to perform this rigid and permanent fixing exclusively between the floor of the outer structure and ends of cladding panels of said self-supporting envelope.

Thus, according to the invention, the self-supporting envelope is fixed only (rigidly and permanently) to the floor, and this makes it possible to reduce the means of transmitting vibration and thus noise. In addition, as in the case of a rotary-wing aircraft, the floor is the part farthest away from the rotor; the vibrations that occur there are those which are attenuated the most.

Furthermore, as this connection at the floor is rigid according to the invention, it is enough to hold the self-supporting envelope in a stable manner on the external structure, even if this connection is limited to one single fixing region (the end of the envelope facing the floor). Such a connection would not have been sufficient with the known connecting means (insulators) or holding means (attachments) anticipated in the aforementioned document U.S. Pat. No. 6,158,690, because all these known means are elastic which means that at least two fixing regions are then necessary in order to obtain holding in a stable fashion.

The present invention has other advantages and, in particular:

a lengthening of life, because of the elimination of any parts made of elastomer;

a reduction in mass, because of the low number of connecting means; and a reduction in the transmission of vibration, because the connecting means are fixed directly to the cladding panels of the self-supporting envelope rather than to a framework which, as indicated previously, encourages the transmission of vibration.

In a preferred embodiment, at least one of said connecting means comprises a rigid angle bracket with two legs, which is fixed:

by one of its legs to the floor of the outer structure; and by the other leg, to a cladding panel of the self-supporting envelope.

In the context of the present invention, an angle bracket is to be understood as meaning a bar (particularly made of metal) made up of two legs or flanges joined together at one of their ends, preferably in the shape of an L.

Furthermore, advantageously, said connecting system additionally comprises a number of auxiliary connecting means which are formed in such a way as to create, in the upper part of the self-supporting envelope which is at the opposite end to the end of the self-supporting envelope which faces the floor of the outer structure, regions of connection with said outer structure which is such that they:

allow a freedom of relative movement, throughout space, between the outer structure and the self-supporting envelope, over predefined distances; and in the case of a relative movement between the outer structure and the self-supporting envelope which exceeds at least one of said predefined distances and which is in at least one predetermined plane in space, stop said relative movement outright.

In consequence, by virtue of the invention:

in the case of normal operation, for which the relative movement between the external structure and the self-supporting envelope remains of course very limited (and smaller than said predefined distances), the freedom for relative movement is total and there is no contact between the external structure and the self-supporting envelope. For such normal operation, the auxiliary connecting means therefore do not transmit vibrations which are sources of noise and are therefore not troublesome; and in the event of a crash or of a violent impact leading to a significant relative movement between the external structure and the self-supporting envelope, said auxiliary connecting means stop said relative movement outright, that is to say create a rigid connection. This in particular makes it possible to obtain a structural assembly which is more rigid in such a situation and thus to prevent excessive deformation. It will be noted that, in the structural assembly disclosed by document U.S. Pat. No. 6,158,690, there is no rigid connection in the upper part of the envelope, and this of course if very penalizing in the event of a crash.

Advantageously, said connecting system comprises auxiliary connecting means which create regions of connection between practically vertical walls of the outer structure of the self-supporting envelope respectively, in said upper part of the self-supporting envelope and said regions of connection are able to perform stopping in a horizontal plane which is orthogonal to said vertical walls.

In this case, as a preference, at least one of said auxiliary connecting means comprises:

a stud with a head, which stud is fixed to a cladding panel; and a plate which is fixed to the outer structure facing said stud and which is provided with an opening collaborating with the head of said stud.

Furthermore, advantageously, said connecting system comprises auxiliary connecting means which create regions of connection between practically horizontal walls of the outer structure of the self-supporting envelope respectively, in said upper part of the self-supporting envelope and said regions of connection are able to perform stopping throughout space. This makes it possible to create regions of connection at the roof of the self-supporting envelope, unlike the teachings of document U.S. Pat. No. 6,158,690, which anticipates no connection at roof level.

As a preference, at least one of said auxiliary connecting means comprises:

two collaborating angle brackets, of which one is fixed to the outer structure and the other is fixed to the self-supporting envelope, the free legs of each of these angle brackets being arranged facing one another and being equipped with holes facing one another; and a peg which passes through said holes, which has a predefined amount of clearance with respect to one of said free legs in the plane thereof, which also has clearance longitudinally along its axis and which has no clearance with respect to the other free leg.

Furthermore, advantageously, said self-supporting envelope comprises means of assembly of at least two cladding panels and each of said assembly means is formed in such a way:

as to allow partial overlap of the two assembled panels along a joining strip;

as to provide a predefined amount of clearance in all the directions of the plane of said joining strip; and as to prevent any clearance in the direction orthogonal to said plane of the joining strip.

In a preferred embodiment, at least one of said assembly means comprises:

a clip and bridging piece assembly allowing a degree of freedom in translation over a predefined distance in a first direction of said plane of the joining strip;

a mounting plate with oblong holes which collaborate with screws allowing sliding over a predefined distance in a second direction of said plane of the joining strip which differs from said first direction; and wedging means ensuring stressed contact along the joining strip in the direction orthogonal to the plane of the joining strip.

Thus, by virtue of the invention, the number of parts (supports, nuts and bolts, etc.) for mounting the cladding panels is reduced, and this makes it possible to obtain a saving in mass, to reduce the cost, and to make the various cladding panels of the self-supporting envelope easier to mount and possibly to replace.

In addition, through the overlapping of the cladding panels in accordance with the invention, the gaps and discontinuities, particularly in the roof, are eliminated and the sound-deadening efficiency is improved.

BRIEF DESCRIPTION OF THE DRAWINGS

The figures of the appended drawing will make it easy to understand how the invention may be embodied. In these figures, identical references denote similar elements.

DESCRIPTION OF THE PREFERRED EMBODIMENT

Figure 1:
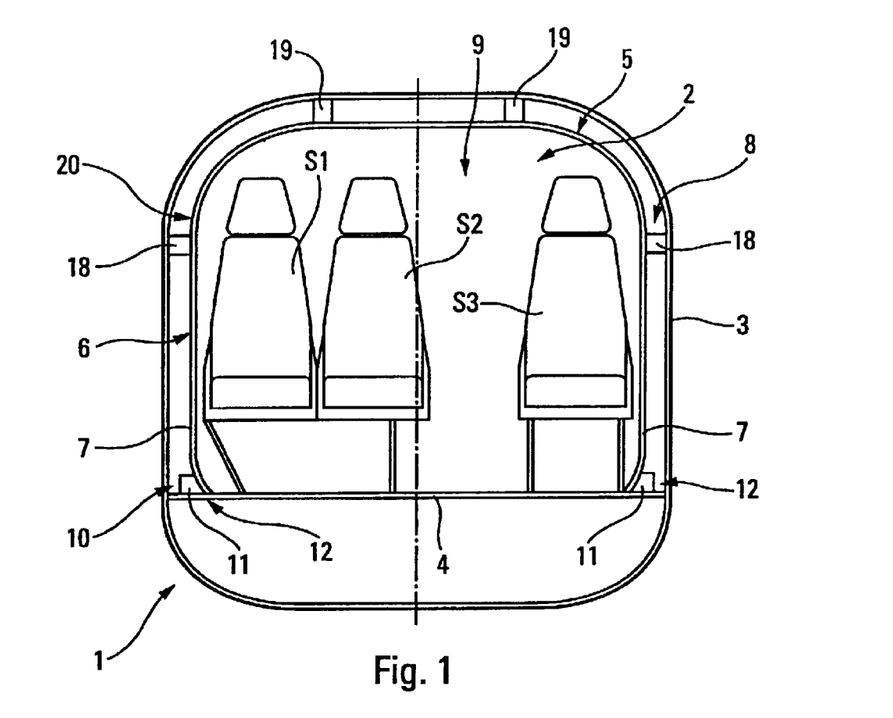
FIG. 1 shows, schematically, in a transverse view, an aircraft fuselage equipped with the present invention.

The present invention relates to a structural assembly 1 of a part 2 of an aircraft, particularly a part intended to be occupied by people, such as the cockpit or passenger cabin of said aircraft. This aircraft may in particular be a rotary-wing aircraft and especially a helicopter. In FIG. 1, this part 2 is schematically depicted as the passenger cabin of the aircraft, which is fitted with seats S1, S2 and S3.

Said structural assembly 1 is of the "double hull" type comprising, in the known way:

an external structure 3 which corresponds to part of the structure of the aircraft fuselage and is equipped with a floor 4;

a cladding assembly 5 comprising a number of cladding panels 6 which are joined together rigidly so as to form a self-supporting envelope 7 which has a shape such that it can be mounted, with an intermediate space 8 which is preferably empty and which generally measures between one centimeter and twenty centimeters, inside 9 said outer structure 3. Said self-supporting envelope 7 is arranged inside said outer structure 3 and mounted on said floor 4; and a connecting system 10 for connecting said self-supporting envelope 7 to said outer structure 3.

According to the invention, said connecting system 10 comprises a number of connecting means 11 which are formed in such a way as to fix said self-supporting envelope 7 to said outer structure 3 by rigid and permanent connections and to perform this rigid and permanent fixing exclusively between the floor 4 of the outer structure 3 and ends 12 (preferably resting on the floor 4) of cladding panels 6 of said self-supporting envelope 7.

Thus, by virtue of the invention, the self-supporting envelope 7 is fixed only (rigidly and permanently) to the floor 4, and this makes it possible to reduce the regions of transmission of vibration and thus the noise. In addition, as in the case of a rotary-wing aircraft, the floor 4 on which the end 12 of the self-supporting envelope 7 is mounted is the part furthest away from the rotor (not depicted); the vibrations there are those which are attenuated the most.

Furthermore, as this connection at the level of the floor 4 is rigid according to the invention, it is enough to hold the self-supporting envelope 7 stably on the external structure 3 even if this rigid connection is restricted to a single fixing region (end 12 of the envelope 7 facing the floor 4).

The structural assembly 1 according to the present invention has other advantages and, in particular:
- a longer life, because of the use of no parts made of elastomer;
- reduction in mass, because of the low number of connecting means 11;
- a reduction in the transmission of vibration, because of the fact that the connecting means 11 are fixed directly to the cladding panels 6 of the self-supporting envelope 7 rather than to a framework which, as mentioned earlier, encourages the transmission of vibration; and, above all
- a reduction in noise due to a double-hull (external structure 3 and envelope 7) or double partition effect obtained by virtue of the invention. This advantageous effect is due in particular to the fact that acoustic attenuation afforded by two panels with a mass per unit area Ms1 and Ms2 (kg/m$^2$) is higher over a wide range of frequencies than the acoustic attenuation of a is single panel with a total mass per unit area of Ms1+Ms2.

The acoustic insulation performance of a double hull relies upon the absence of mechanical contact between the structure of the fuselage and the cladding panels, except at the end 12. The residual excitation of the collection of internal claddings that makes up this double hull is therefore purely acoustic. The solid body excitations originating from the points of attachment to the fuselage (cabin roof, upper part of the bulkheads and of the side walls of the fuselage, etc.) are eliminated. There is no longer any vibrational short circuit which limits the overall acoustic attenuation of the claddings when they are fixed directly to the structure.

The direct consequence of applying the "double hull" concept in a rotary-wing aircraft is:
- a reduction in cabin noise in respect of all noises external to the cabin (pure sound and broadband) which is greater than that obtained with the customary claddings, and true over a broad range of frequencies;
- a saving in mass over all the cladding panels;
- an improvement in the sealing leading to a significant reduction in acoustic leaks and therefore local noise sources.

Figure 2:
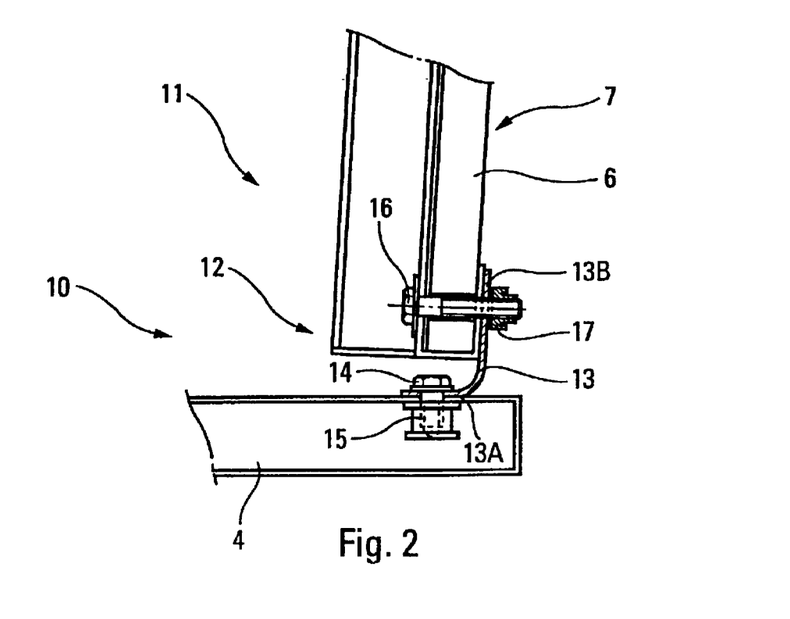
FIG. 2 schematically illustrates a preferred embodiment of connecting means according to the invention.

In one particular embodiment, said connecting means 11 each comprise, as depicted in FIG. 2, a rigid angle bracket 13 with two legs 13A and 13B, of known type, which is fixed:
- by one 13A of its legs to the floor 4 of the outer structure 3 by known means, for example a screw 14/nut 15 assembly; and
- by the other 13B leg, to a cladding panel 6 of the self-supporting envelope 7, also by known means such as a screw 16/nut 17 assembly in particular.

In the embodiment of FIG. 2, the envelope 7 is not directly in contact with the structure 3 at the level of the floor 4. However, in a preferred embodiment which has not been depicted, the envelope 7 rests directly on the floor 4 and this makes it possible to improve the stability of said envelope 7. In this case, the connecting means 11 are suited to the position of the elements that are to be fixed together.

According to the invention, said connecting system 10 additionally comprises a number of auxiliary connecting means 18, 19 which are formed in such a way as to create, in the upper part 20 of the self-supporting envelope 7 which is at the opposite end to the end of the self-supporting envelope 7 which faces the floor 4 of the outer structure 3, regions of connection with said outer structure 3 which are such that they:
- allow a freedom of relative movement, throughout space, between the outer structure 3 and the self-supporting envelope 7, over predefined distances, preferably shorter than four millimeters; and
- in the case of a relative movement between the outer structure 3 and the self-supporting envelope 7 which exceeds at least one of said predefined distances and which is in at least one predetermined plane in space, stop said relative movement outright.

In consequence, by virtue of the invention:
- when the aircraft is operating normally without excessive shaking, for which the relative movement between the external structure 3 and the self-supporting envelope 4 of course remains very limited (and smaller than said predefined distances), the freedom of relative movement at the auxiliary connecting means 18, 19 is total and there is no contact between the external structure 3 and the self-supporting envelope 7. For such normal and customary operation, the auxiliary connecting means 18, 19 do not therefore transmit vibrations which are the sources of noise and are therefore not troublesome; and
- in the event of a crash or a violent impact giving rise to a significant relative movement between the external structure 3 and the self-supporting envelope 7, said auxiliary connecting means 18, 19 stop said relative movement outright, that is to say give rise to a rigid connection. This in particular makes it possible to obtain a structural assembly 1 which is more rigid in this case and thus to prevent significant deformation.

To achieve this, said connecting system 10 comprises first of all auxiliary connecting means 18 which create regions of connection between vertical walls 3A and 7A of the outer structure 3 and the self-supporting envelope 7 respectively, in said upper part 20 of the self-supporting envelope 7 and said regions of connection are able to perform stopping in a horizontal plane which is orthogonal to said vertical walls 3A, 7A. In the embodiment depicted in FIGS. 3 and 4, this horizontal plane is formed by the directions X1—X1 and Y1—Y1 and the vertical walls 3A and 7A are parallel to a vertical plane formed by the directions Y1—Y1 and Z1—Z1.

Figure 3:
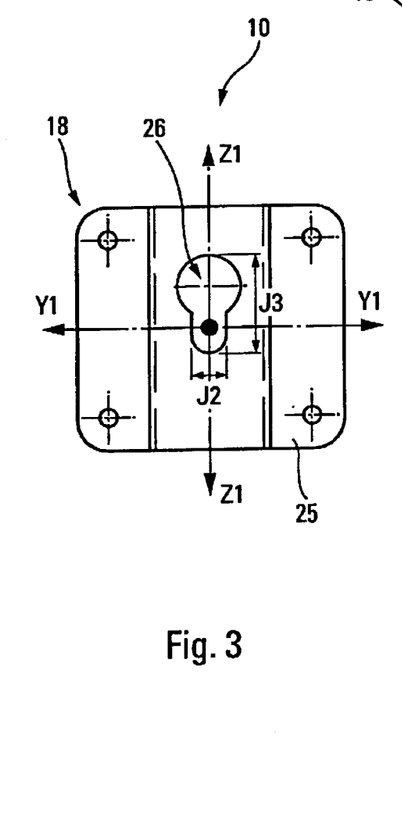
FIGS. 3 and 4 schematically show, a plan view of a plate of a first auxiliary connecting means, and a transverse view of this first auxiliary connecting means, respectively.
Figure 4:
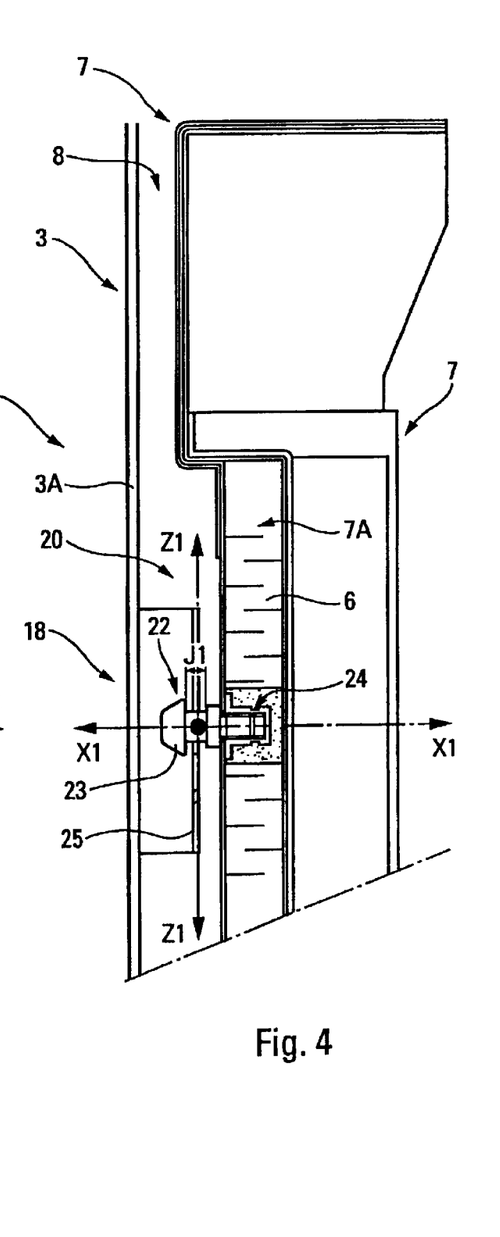

In the preferred embodiment depicted in FIGS. 3 and 4, an auxiliary connecting means 18 comprises:
- a stud 22 equipped with a broad head 23, which stud is fixed to a cladding panel 6 by known means 24; and
- a plate 25 which is fixed to the inside of the outer structure 3 facing said stud 22 and which collaborates with the latter. To this end, said plate 25 is equipped with an opening 26 comprising a round part, of a diameter greater than the diameter of the head 23 of the stud 22, and an oblong part (which is made in the vertical direction Z1—Z1) of a width smaller than the diameter of the head 23 of the stud 22, the two, round and oblong, parts being contiguous.

By virtue of this embodiment, the stud 22, and therefore the envelope 7, can move with respect to the plate 25 and therefore with respect to the external structure 3:

- by a small clearance J1 in the direction X1—X1;
- by a small clearance J2 in the direction Y1—Y1; and
- by a far greater clearance J3 in the direction Z1—Z1.

Said clearances J1 and J2 represent the aforementioned predefined distances and are preferably of the order of a few millimeters, the clearance J3 being far greater.

By way of example, the clearances J1 and J2 are smaller than four millimeters and the clearance J3 is equal to or greater than the sum of the diameters of the head 23 of the stud 22 and of the cylindrical body of said stud 22 situated under said head 23.

Thus, by virtue of the invention, fixing points, unstressed at rest, serve to afford safety in the event of a crash or violent impact with freedom in three axes (X1—X1, Y1—Y1, Z1—Z1) under static conditions but dead stops when stressed dynamically along at least one of two axes (X1—X1, Y1—Y1).

Secondly, said connecting system 10 also comprises auxiliary connecting means 19 which create regions of connection between practically horizontal walls 3B and 7B of the outer structure 3 of the self-supporting envelope 7 respectively, in said upper part 20 of the envelope 7, that is to say at roof level, and said regions of connection are able to perform stopping throughout space.

This makes it possible to create rigid regions of connection at roof level in the event of a crash or violent impact. Of course, as mentioned previously, in the event of normal operation, the auxiliary connecting means 19 (like the auxiliary means 18) make no contact and allow total freedom of relative movement so that, in this case, the envelope 7 is fixed to the structure 3 only at the floor 4 via the connecting means 11.

Figure 5:
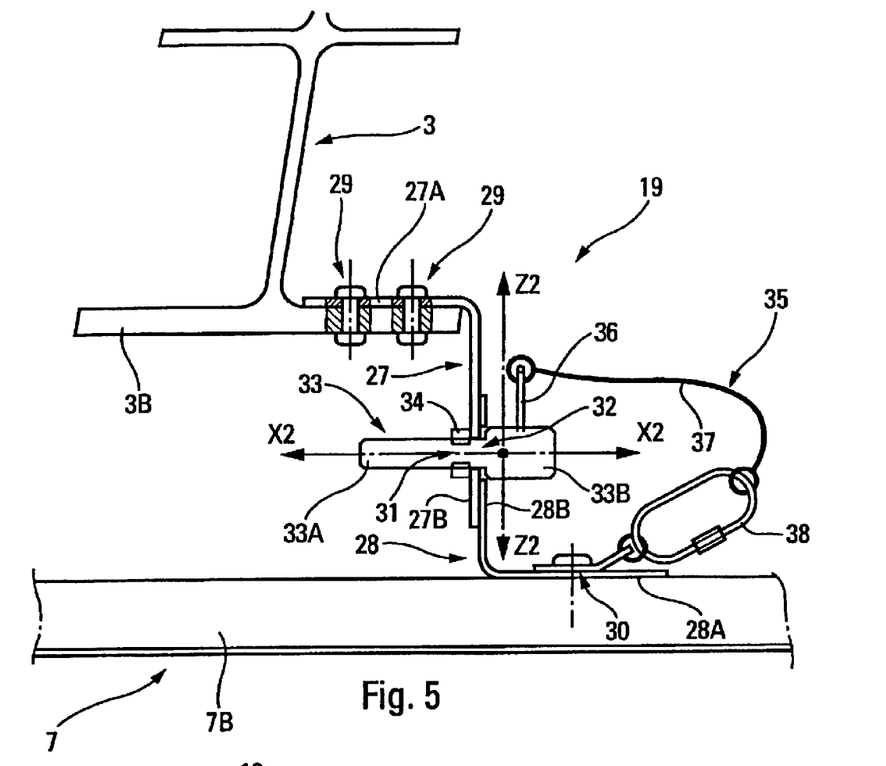
FIGS. 5 and 6 schematically show a transverse view and a part view from above, respectively, of a second auxiliary connecting means.
Figure 6:
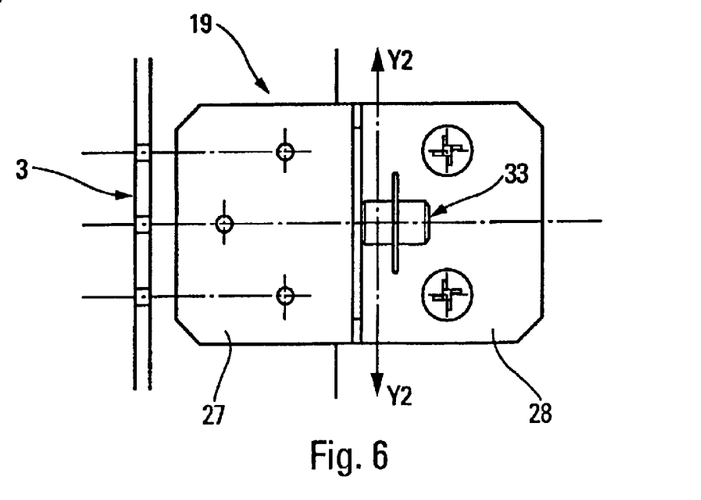

In the preferred embodiment depicted in FIGS. 5 and 6, a connecting means 19 comprises:

two collaborating angle brackets 27, 28, of which one 27 is fixed by one leg 27A to the outer structure 3 (by known means 29, for example screw/nut assemblies) and the other 28 is fixed by one leg 28A to the self-supporting envelope 7 also by known means 30, preferably screw/nut assemblies, the free legs 27B, 28B of each of these angle brackets 27 and 28 being arranged facing one another and each equipped with a hole 31 and 32, the two holes 31 and 32 facing one another; and a peg 33 which passes through said holes 31 and 32.

The peg 33 has a first cylindrical portion 33A which has a diameter suited to the diameter of the hole 31 and a second cylindrical portion 33B connected to said first portion 33A and having a diameter greater than the diameter of the hole 32.

As can be seen in FIG. 5, the hole 32 has a large diameter so as to generate clearance (preferably less than four millimeters) around the portion 33A, this allowing relative movement between, on the one hand, the angle bracket 28 and, on the other hand, the peg 33 and therefore the angle bracket 27 (to which the peg 33 is fixed by means of a clip 34) in a vertical plane formed by directions Y2—Y2 and Z2—Z2. As can also be seen in FIG. 5, the clip 34 is fixed such a distance away from the portion 33B that it allows clearance or displacement (preferably of less than five millimeters) in a longitudinal direction X2—X2.

In addition, FIG. 5 depicts means 35, 36, 37 and 38 which are intended to connect the peg 33 to the corresponding cladding panel to leave said peg 33 secured to said panel during disassembly.

Thus, by virtue of the invention, fixing points, unstressed at rest, serve to afford safety in the event of a crash or violent impact, with freedom along three axes (X2—X2, Y2—Y2 and Z2—Z2) under static conditions, but dead stops when stressed dynamically along at least one of the three axes.

Figure 7:
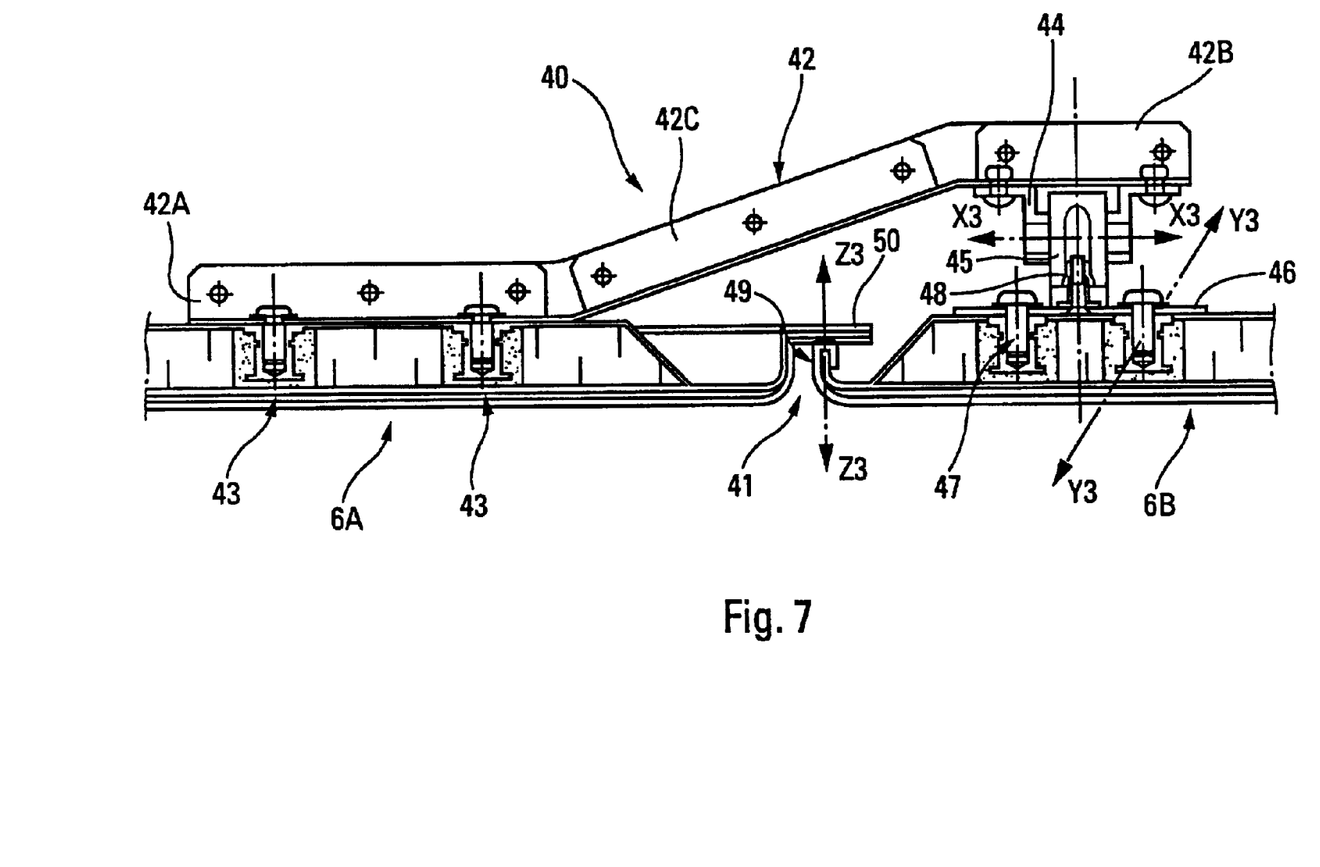
FIG. 7 schematically illustrates a means according to the invention of assembling two cladding panels.

Furthermore, according to the invention, two cladding panels 6A, 6B are joined together by assembly means 40, each of said assembly means 40 being formed in such a way:

- as to allow partial overlap of the two assembled panels 6A and 6B along a joining strip 41;
- as to provide a predefined amount of clearance (preferably of less than five millimeters) in all the directions of the plane (defined by the directions X3—X3 and Y3—Y3 in FIG. 7) of said joining strip 41; and
- as to prevent any clearance in the direction Z3—Z3 orthogonal to said plane of the joining strip 41.

Thus, by virtue of the invention, the number of parts (supports, nuts and bolts, etc.) for mounting the cladding panels 6A, 6B is reduced, and this makes it possible to obtain a saving in mass, to reduce the cost, and to make the cladding panels 6A, 6B easier to mount and possibly to replace.

In addition, because of the overlap of the cladding panels 6, 6A, 6B according to the invention, the gaps and discontinuities, particularly in the roof, are eliminated and the effectiveness of the sound proofing is improved.

In addition, according to the invention, cladding panels with large surface areas are encouraged, particularly to limit the number of joining strips 41. This makes it possible to increase the flexural and torsional rigidity of the envelope 7, and the acoustic sealing.

In a preferred embodiment depicted in FIG. 7, the assembly means 40 comprises an arm 42 comprising three legs 42A, 42B and 42C connected together, of which one end leg 42A is fixed by known means 43 to the panel 6A and the other end leg 42B is separated from the panel 6B and comprises means for connecting said arm 42 to this panel. These means comprise:

an assembly which is equipped with a bridging piece 44 fixed to the end 42B of the arm 42 and with a clip 45 mounted on this bridging piece 44, and which allows a degree of freedom in translation over a predefined distance in the direction X3—X3 of said plane of the joining strip 41; and a mounting plate 46 which is equipped with oblong holes collaborating with screws 47 fixed to the panel 6B and a screw 48 secured to the clip 44 and which allows sliding over a predefined distance in the direction Y3—Y3.

As can be seen in FIG. 7, the joining strip 41 is formed by bringing a curved end 49 of the panel 6B into contact with a flat end 50 of the panel 6A.

According to the invention, the assembly means 40 provide stressed contact of these two ends 49 and 50 along the joining strip 41 in the direction Z3—Z3 which is orthogonal to the plane of said joining strip 41.

It will be noted that the assembly means 40 may be applied in particular to:

- sandwich panels and/or monolithic panels, even thin ones;
- flat panels and/or panels which are curved in one or two directions.

The present invention described earlier makes it possible in particular to reduce the following noises of a rotary-wing aircraft:

the gear or bearing noises originating from the transmission gearbox (main transmission gearbox, intermediate transmission gearbox, tail transmission gearbox);

the gear or bearing noise of auxiliary casings (lubrication pumps, ventilation unit drive, air conditioning, etc.);

engine or main transmission gearbox air intake noise;

ventilation noise;

heating noise; and air conditioning noise.

What is claimed is:

1. A structural assembly of an aircraft, comprising:

an outer structure which corresponds to part of the structure of the aircraft and which is equipped with a floor;

a cladding assembly comprising a number of cladding panels joined together rigidly to form a self-supporting envelope mounted on said floor inside said outer structure, wherein an intermediate space is provided between said self-supporting envelope and said outer structure;

a connecting system for connecting said self-supporting envelope to said outer structure, wherein said connecting system comprises a plurality of connectors that rigidly and permanently fix said self-supporting envelope to said outer structure between the floor of the outer structure and ends of said cladding panels of said self-supporting envelope, said self-supporting envelope and said outer structure being rigidly and permanently connected to one another only by said plurality of connectors.

2. The structural assembly as claimed in claim 1, wherein at least one of said connectors comprises a rigid angle bracket with two legs, which is fixed:

by one of said legs to the floor of the outer structure; and by the other of said legs, to a cladding panel of the self-supporting envelope.

3. The structural assembly as claimed in claim 1, wherein said connecting system additionally comprises a number of auxiliary connectors that provide regions of connection between said self-supporting envelope and said outer structure on an upper portion of said self-supporting envelope opposite said floor of said outer structure so as to:

allow a freedom of relative movement, throughout said intermediate space, between the outer structure and the self-supporting envelope, over predefined distances; and stop said relative movement during relative movement between the outer structure and the self-supporting envelope exceeding at least one of said predefined distances and moving in at least one predetermined plane in space.

4. The structural assembly as claimed in claim 3, wherein said connectors create regions of connection between substantially vertical walls of the outer structure and of the self-supporting envelope respectively, in said upper part of the self-supporting envelope and wherein said regions of connection stop relative movement between the outer structure and the self-supporting envelope in a horizontal plane which orthogonal to said vertical walls.

5. The structural assembly as claimed in claim 4, wherein at least one of said auxiliary connectors comprises:

a stud that is equipped with a head and fixed to a cladding panel; and a plate which is fixed to the outer structure facing said stud and which includes an opening collaborating with the head of said stud.

6. The structural assembly as claimed in claim 3, wherein said auxiliary connectors create regions of connection between substantially horizontal walls of the outer structure and of the self-supporting envelope respectively, in said upper part of the self-supporting envelope and wherein said regions of connection stop relative movement between the outer structure and the self-supporting envelope throughout the intermediate space.

7. The structural assembly as claimed in claim 6, wherein at least one of said auxiliary connectors comprises:

two collaborating angle brackets one of which one is fixed to the outer structure and the other of which is fixed to the self-supporting envelope, wherein free legs of each of said angle brackets face one another and include holes therein facing one another; and a peg which passes through said holes, which has a predetermined amount of clearance with respect to one of said free legs in a plane thereof, which also has a clearance longitudinally along its axis and which has no clearance with respect to the other of said free legs.

8. The structural assembly as claimed in claim 1, wherein said self-supporting envelope comprises means of assembly for at least two cladding panels and wherein each of said assembly means comprises:

means to provide a partial overlap of two assembled panels along a joining strip;

means to provide a predefined amount of clearance in all directions of a plane of said joining strip; and means to prevent any clearance in a direction orthogonal to said plane of the joining strip.

9. The structural assembly as claimed in claim 8, wherein at least one of said assembly means comprises:

an arm member mounted on one of said cladding panels;

a bridging piece mounted on said arm member having a clip movably mounted thereon forming an assembly allowing a degree of freedom in translation over a predefined distance in a first direction of said plane of the joining strip;

a mounting plate having oblong holes that collaborate with screws fixed to the other of said panels and a screw secured to the clip allowing sliding over a predefined distance in a second direction of said plane of the joining strip which differs from said first direction; and a wedging means ensuring a stressed contact along the joining strip in the a direction orthogonal to the plane of the joining strip.

10. An aircraft having the structural assembly as described in claim 1.

11. An aircraft as in claim 10, wherein the aircraft is a helicopter.

12. A structural assembly as in claim 1, wherein the aircraft is a helicopter.

* * * * *